Aug. 22, 1933.  O. BERGA ET AL  1,924,019
EAR CORN CRUSHER
Filed March 26, 1932  2 Sheets-Sheet 1
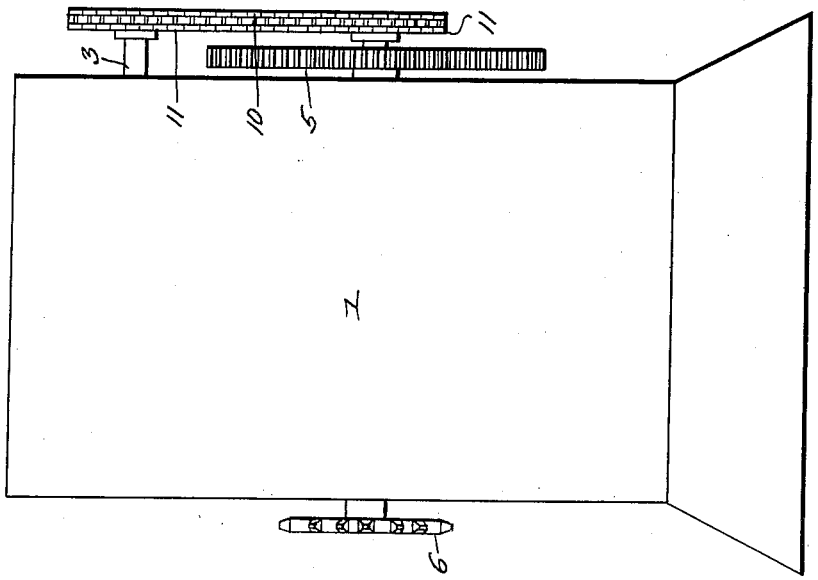
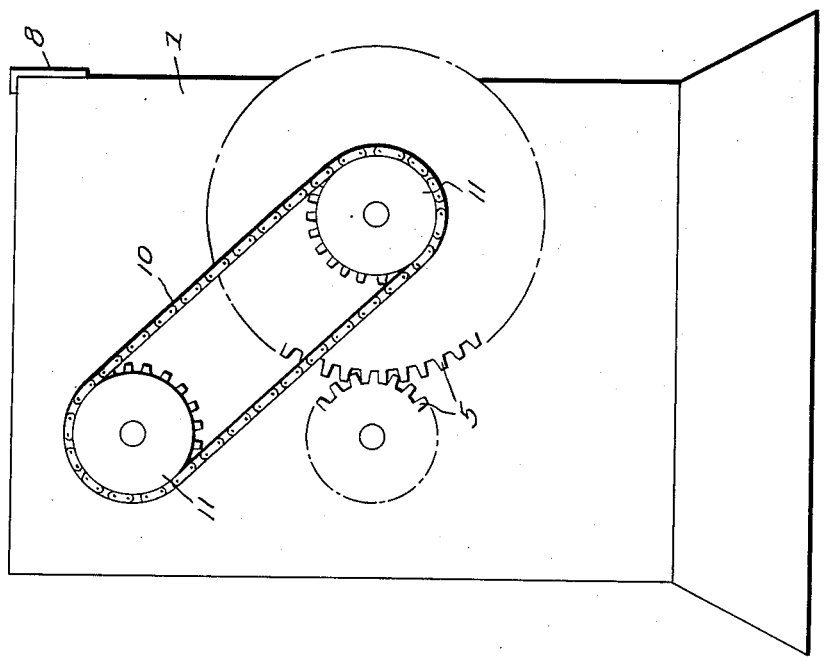
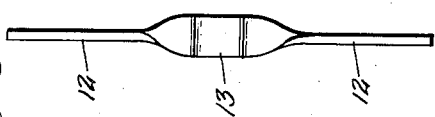
Inventor
Oscar Berga,
Lyman A. Rambo,
By Clarence A. O'Brien
Attorney Aug. 22, 1933.  O. BERGA ET AL  1,924,019
EAR CORN CRUSHER
Filed March 26, 1932   2 Sheets-Sheet 2
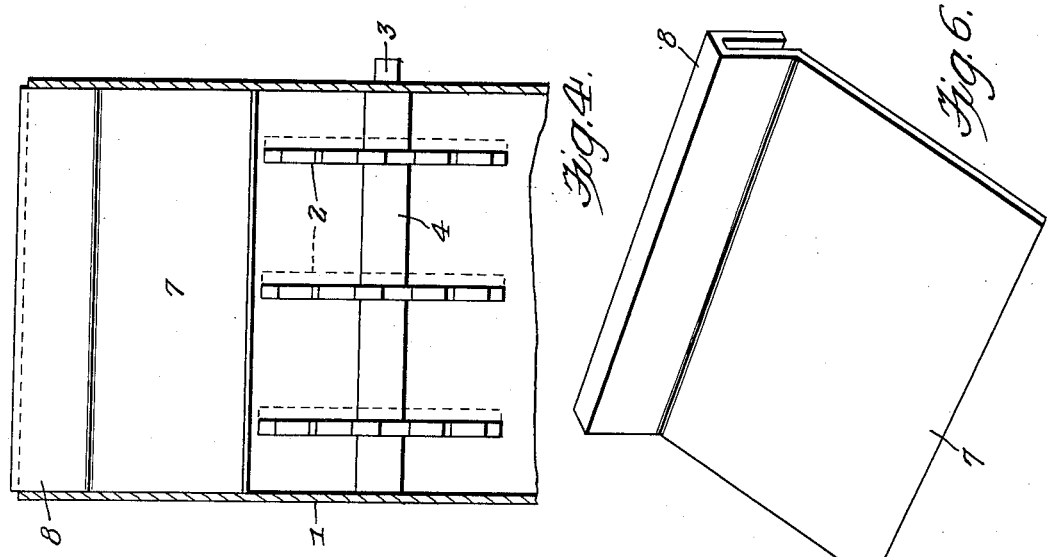
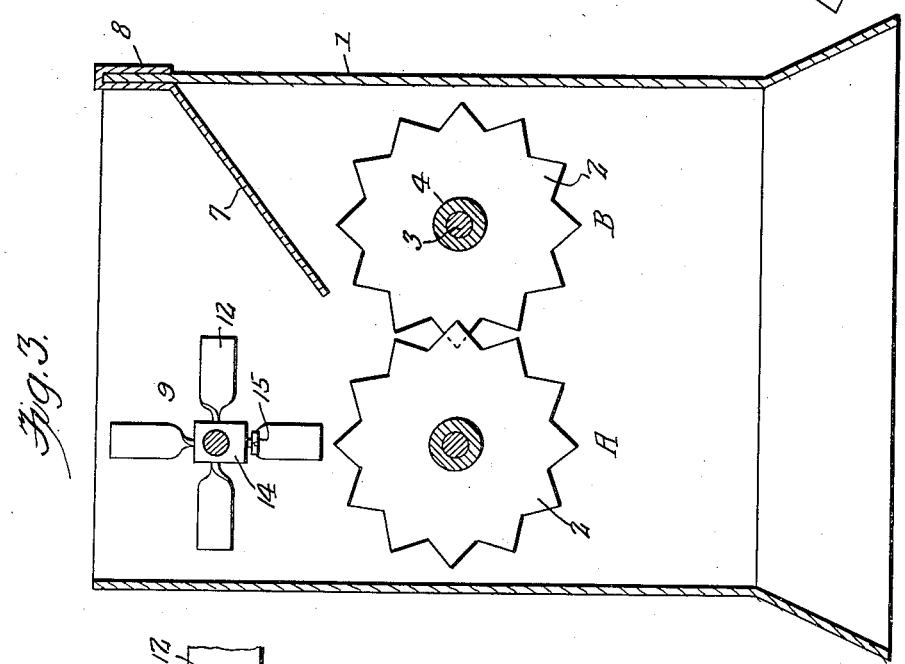
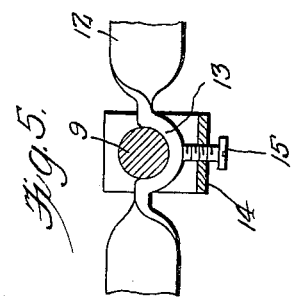
Inventor
Oscar Berga,
Lyman A. Rambo,
By Clarence A. O'Brien
Attorney Patented Aug. 22, 1933

1,924,019

UNITED STATES PATENT OFFICE 1,924,019

EAR CORN CRUSHER

Oscar Berga and Lyman A. Rambo, Amboy, Ill.

Application March 26, 1932. Serial No. 601,374

1 Claim. (Cl. 146—122)

This invention relates to improvements in ear corn crushers, the general object of the invention being to provide means for agitating the ears of corn being fed to the crushing rolls, and to force the ears toward the rolls and to prevent the ears slipping away from the rolls.

Another object of the invention is to provide a baffle plate to prevent clogging of the ears above the crushing rolls.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings, wherein like characters denote like or corresponding parts throughout the several views, and in which:—

Figure 1 is an elevation of a part of a crushing machine constructed in accordance with this invention.

Fig. 2 is a similar view but looking toward the sides having the gears and chain and sprockets arrangement thereon.

Fig. 3 is a vertical sectional view through Fig. 1.

Fig. 4 is a vertical sectional view through Fig. 3.

Fig. 5 is a sectional view through the beater shaft and showing the means for connecting the blade forming member thereto.

Fig. 6 is a perspective view of the baffle.

Fig. 7 is a view of one of the blade forming members.

In these drawings the numeral 1 indicates the hopper of a crushing machine and the letters A and B indicate the crushing rolls located therein. Each roll comprises a number of toothed wheels 2 placed on a shaft 3 and held in spaced relation by the spacers 4. Gears 5 are placed on the shafts 3 and mesh with each other, and one of the shafts is rotated by a chain drive 6 or other means in a direction to cause the rolls to rotate toward each other as is usual, so that the toothed wheels will crush and break up ears of corn passing between them. This device can be used on crushers that use either one or two rolls.

In carrying out our invention, we provide a baffle plate 7 which has a hooked part 8 at one end thereof, fitting over the upper edge of one side wall of the hopper and this plate extends forwardly and downwardly over a part of the roll B.

A shaft 9 is journalled in the hopper above the roll A and is rotated from the shaft of the roll B by the chain 10 and the sprockets 11, one of which is attached to the shaft 3 of the roll B and the other one is attached to the shaft 9. This shaft 9 carries a plurality of blades or beaters 12, each pair of which is formed from a single flat bar, as shown in Fig. 7, with the center part twisted so that this central part lies at right angles to the blade forming end parts.

This central part is bent to semi-circular shape as shown at 13 to form a recess to receive part of the shaft. Each part is held to the shaft by a U-shaped clip 14 which has holes in its limbs for passage of the shaft with the semi-circular part 3 of the bar passing between the limbs and the bight part of the clip carries a set screw 15 which clamps the semi-circular part 13 to the shaft as clearly shown in Fig. 5.

Thus the blade forming portions of the bars are so positioned that their edges will engage the ears of corn, and these blades will act to cause the ears to contact with the roll B and in this manner force the ears down through the rolls. The blades also act as agitating means for the ears of corn, to bring the ears into direct contact with the rolls, thus acting as a force feeder and preventing the ears from slipping away the toothed wheels as they will do particularly when the toothed wheels are somewhat dull.

Thus the invention will materially increase the capacity of the crushing machine, and the baffle plate will prevent bridging or clogging of the ears of corn, which happens in crushing machines of this type.

This device provides for a continuous and uninterrupted feed of the ears to the crushers.

It is thought from the foregoing description that the advantages and novel features will be readily apparent.

It is to be understood that changes may be made in the construction and in the combination and arrangement of the several parts provided that such changes fall within the scope of the appended claim.

Having thus described our invention, what we claim as new is:—

In an ear corn crusher, a pair of crushing rollers, means for rotating the rollers towards each other, a shaft rotatably arranged above one of the rollers, blade-like members arranged in groups on the shaft with the groups spaced apart, means for rotating the shaft in an opposite direction from the direction of rotation of the roller over which it is placed, whereby the blade-like members will force the ears of corn towards the other roller, and a downwardly and inwardly sloping baffle plate located above and spaced from said other roller.

OSCAR BERGA.
LYMAN A. RAMBO.